No. 614,670. Patented Nov. 22, 1898.
G. J. STEVENS & J. HIX.
SUSPENSION WHEEL FOR VELOCIPEDES.
(Application filed Aug. 9, 1897.)
(No Model.)
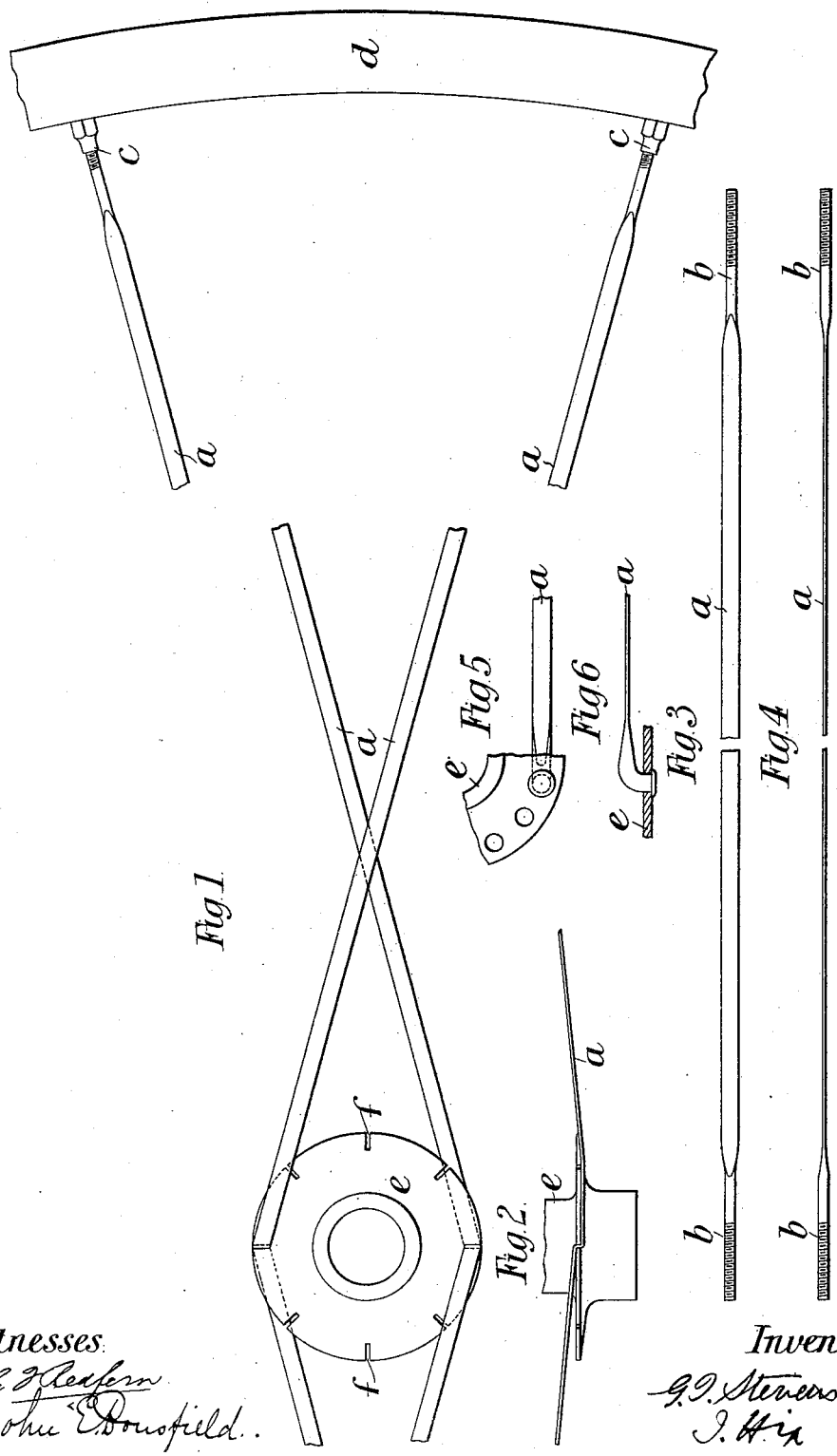
Witnesses
Inventors

UNITED STATES PATENT OFFICE.

GEORGE JOHN STEVENS AND JAMES HIX, OF LONDON, ENGLAND.

SUSPENSION-WHEEL FOR VELOCIPEDES.

SPECIFICATION forming part of Letters Patent No. 614,670, dated November 22, 1898.

Application filed August 9, 1897. Serial No. 647,614. (No model.)

*To all whom it may concern:*

Be it known that we, GEORGE JOHN STEVENS and JAMES HIX, subjects of the Queen of Great Britain, residing at London, England, have invented new and useful Improvements in Suspension-Wheels for Velocipedes or other Vehicles, (for which Letters Patent were granted to us in Great Britain, No. 24,158, dated October 29, 1896,) of which the following is a specification.

Our invention relates to the construction of bicycle and other vehicle wheels with flat spokes for offering as little resistance as possible to the air when traveling.

In carrying out our invention we preferably make the spokes from round wire, the intermediate portion of which between the ends is flattened out to the desired extent, while the end portions are left round to permit of fixing the spokes. The hub of the wheel through which the flat spokes are laced is made with holes or slots.

To enable our invention to be fully understood, we will describe the same by reference to the accompanying drawings, in which—

Figure 1 is a side elevation of a portion of a wheel having our improvements applied to it, and Fig. 2 is a plan view of part of the hub, showing the method of attaching the spokes. Figs. 3 and 4 are a face view and an edge view, respectively, of one of our improved spokes adapted to be applied as a laced spoke; and Figs. 5 and 6 are similar views showing a modification in the construction of the spoke which we employ when our invention is applied to single spokes—that is to say, to spokes which extend only from the hub to the rim.

A spoke made according to our invention is made out of round wire and has the portion between the two ends flattened, as shown at *a*, in such a manner that when the spoke is applied to the wheel the flat surface thereof will be practically parallel with the plane of rotation of the wheel. The end or ends of the spoke adapted to be attached to the wheel-rim are left round, as shown at *b*, and screw-threaded, so as to receive a screwed nipple or nipples for effecting the connection between the spokes and the rim—for instance, as shown at *c* in Fig. 1, in which figure *d* indicates the wheel-rim and *e* the hub.

When using laced or double spokes—that is to say, spokes which are connected to the hub and to the rim at two points—we advantageously form radial slots *f* in the hub, as indicated in Figs. 1 and 2, the spokes being bent to pass through the slots, as clearly seen in Fig. 2. With the slots *f f* thus arranged the points of connection of the two ends to the rim will be more or less diametrically opposite to one another; but it is to be understood that the position of the slots will vary somewhat, according to the distance between the ends of a double spoke. For instance, if the two ends are separated by, say, an angle of ninety degrees, the slots instead of being radial to the axis would be in a position at right angles.

When we use single spokes, which are attached to the hub at one end and to the wheel-rim at the other, we advantageously form the end which is adapted for attachment to the hub of round section of a diameter equal to the breadth of the spoke, as shown in Figs. 5 and 6, so that the broad part of the spoke may be passed through the hole in the hub, the round head of the spoke closing the said hole when the spoke is in position.

Having now particularly described and ascertained the nature of our said invention and in what manner the same is to be performed, we declare that what we claim is—

1. A spoke for a suspension-wheel, having portions adjacent its ends round and screw-threaded and the portion intermediate its ends flattened, substantially as described.

2. A spoke for a suspension-wheel having its ends provided with securing means, the portion intermediate its ends flattened and a portion of said intermediate flattened part bent at substantially right angles for engagement with the hub, whereby said spoke will extend from one part of the rim to the hub and thence to another portion of the rim, substantially as described.

3. A suspension-wheel comprising among its members a rim, a hub provided with recesses or open slots formed therein, and a series of spokes, each spoke having its ends secured to the rim at isolated points, a flattened portion intermediate its ends and a part of said intermediate flattened portion bent substantially at right angles to the other portions, and engaging one of said recesses in the hub, substantially as described.

GEORGE JOHN STEVENS.
JAMES HIX.

Witnesses:
G. I. REDFERN,
JOHN E. BONSFIELD.